(12) United States Patent
Magee et al.

(10) Patent No.: US 6,322,404 B1
(45) Date of Patent: Nov. 27, 2001

(54) HALL EFFECT TRIM SENSOR SYSTEM FOR A MARINE VESSEL

(75) Inventors: Phillip D. Magee, Stillwater; Guy A. Coonts, Ripley; Bret A. Martin, Stillwater, all of OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/688,040

(22) Filed: Oct. 9, 2000

(51) Int. Cl.[7] .................................................. B60L 1/14
(52) U.S. Cl. .................................... 440/2; 440/53
(58) Field of Search ............................. 440/1, 2, 61, 53, 440/54, 55, 56, 57

(56) References Cited

U.S. PATENT DOCUMENTS

| | | | |
|---|---|---|---|
| 3,931,784 | * 1/1976 | Collis et al. | 440/2 |
| 4,493,656 | * 1/1985 | Inoue et al. | 440/2 |
| 4,551,105 | 11/1985 | Hall | 440/61 |
| 4,624,643 | * 11/1986 | Ohlsson et al. | 440/2 |
| 4,631,035 | 12/1986 | Nakahama | 440/61 |
| 4,865,568 | 9/1989 | Koike | 440/2 |
| 5,512,820 | 4/1996 | Alfors | 324/207 |
| 5,627,465 | 5/1997 | Alfors et al. | 324/207 |
| 5,694,039 | 12/1997 | Alfors | 324/207 |

* cited by examiner

Primary Examiner—Stephen Avila
(74) Attorney, Agent, or Firm—William D. Lanyi

(57) ABSTRACT

A Hall effect rotational position sensor is mounted on a pivotable member of a marine propulsion system and a rotatable portion of the rotational position sensor is attached to a drive structure of the marine propulsion system. Relative movement between the pivotable member, such as a gimbal ring, and the drive structure, such as the outboard drive portion of the marine propulsion system, cause relative movement between the rotatable and stationary portions of the rotational position sensor. As a result, signals can be provided which are representative of the angular position between the drive structure and the pivotable member.

11 Claims, 3 Drawing Sheets

HALL EFFECT TRIM SENSOR SYSTEM FOR A MARINE VESSEL

BACKGROUND OF THE INVENTION

1. Field of the Invention

The present invention is generally related to a trim sensor and, more particularly, to a trim sensor system for a propulsion device of a marine vessel in which a Hall effect rotational position sensor provides a signal which is representative of the trim angle of the drive system.

2. Description of the Prior Art

Many different types of marine propulsion systems are known to those skilled in the art. One particular type of marine propulsion system comprises a drive unit attached to the transom of a marine vessel with a driveshaft extending through the transom, connecting an internal combustion engine in torque transmitting relation with the drive unit. This type of system is commonly referred to as a "stem drive system". The marine drive system is rotatable about a generally vertical axis for steering and about a horizontal axis for trim and tilt control. A sensor is typically provided to allow the trim angle of the drive unit to be monitored. Known trim sensors for marine propulsion devices utilize potentiometers or rheostats in which a moveable stylus moves across stationary conductors to provide a change in resistance that is responsive to movement of the marine drive unit.

U.S. Pat. No. 4,865,568, which issued to Koike on Sep. 12, 1989, described a trim angle sensor for a marine propulsion device. Several embodiments of trim angle sensors for marine outboard drives are disclosed. The device embodies a gear reduction unit so that the sensor will operate only over a linear portion of its operational range.

U.S. Pat. No. 4,631,035, which issued to Nakahama on Dec. 23, 1986, describes a hydraulic tilt device for a marine propulsion unit. A number of embodiments of hydraulic tilt and trim units for marine outboard drives is disclosed. The devices employ a reversible fluid pump that drives a double acting cylinder to effect pivotal movement of the outboard drive between a tilted up and a tilted down position. The circuitry of the connection between the fluid pump and motor is such that the displaced fluid from the fluid motor need not flow through the pump during tilt down operation so that tilt down operation can be accomplished at a greater rate of speed than tilt up operation.

U.S. Pat. No. 4,551,105, which issued to Hall on Nov. 5, 1985, describes a marine propulsion device with tilt and trim means with fluid filtering. The device includes a member adapted to be connected to a boat hull, and a propulsion assembly pivotally connected to the member for vertical swinging movement when the member is attached to the boat hull. The device also includes a plurality of hydraulic assemblies, each of the hydraulic cylinder assemblies including a hydraulic cylinder and a piston rod slidably received in the cylinder.

U.S. Pat. No. 5,694,039, which issued to Alfors on Dec. 2, 1997, describes an angular position sensor having multiple magnet circuits. The rotational position sensor, or angular position sensor, has two pole pieces. Each of the pole pieces has a first end portion and a second end portion. The two end portions are arranged in overlapping parallel association to provide a gap between them. Two magnetically sensitive components are disposed in the gap between the second end portions of the two pole pieces. The two magnetically sensitive components are used to provide redundancy in the event that one of the magnetically sensitive components experiences a failure.

U.S. Pat. No. 5,627,465, which issued to Alfors et al on May 6, 1997, describes a rotational position sensor with mechanical adjustment of offset and gain signals. The sensor is provided with a rotatable magnetic structure that comprises a primary magnet and a secondary magnet. The primary and secondary magnets are adjusted in position relative to each other in order to achieve an adjustability of the gain and offset characteristics of an output signal from a magnetically sensitive component disposed within the magnetic field of the magnetic structure. The primary and secondary magnets are rigidly maintained in position relative to each other and disposed for rotation about an axis of rotation. Each magnet has a magnetic axis extending through its first and second magnet poles. The two magnetic axes rotate within parallel planes that are each perpendicular to the axis of rotation of the magnetic structure.

U.S. Pat. No. 5,512,820, which issued to Alfors on Apr. 30, 1996, describes a rotational position sensor with a two-part rotatable member to resist jamming. A rotational position sensor is provided with a rotatable member that comprises first and second portions. The first portion is generally cylindrical and has an opening that is shaped to receive the second portion therein with a resilient spring disposed in the annular gap between the first and second portions when this assembly is accomplished. A magnet is molded into or otherwise affixed to an extension of the first portion and the second portion of the rotatable member is shaped to receive a shaft. Relative rotation is permitted between the first and second portions of the rotatable member so that the shaft will not be seized in position if the rotatable member is jammed within a stationary portion of the sensor.

Trim sensors that are presently used in association with marine propulsion devices typically include potentiometers. These types of devices vary the resistance of the sensor as a result of electrical contacts moving in relation to each other. If water intrudes into the housing of the device, potentiometers fail rather quickly. Since the trim sensors are located under water when associated with a marine propulsion system, intrusion of water as a result of leaks in the housing of the sensor create severe problems. Some potentiometers also have a mechanical stop included as an internal component which does not allow them to rotate freely. If these sensors are installed at an inappropriate angle, they can easily be broken if improperly installed. It would therefore be significantly beneficial if a trim sensor could be provided for a marine propulsion unit which is not rendered inoperable as a result of water leaking through a portion of the housing. It would be further beneficial if the rotational position sensor could operate without requiring that one internal component slide upon another internal component in direct physical contact with the other component.

SUMMARY OF THE INVENTION

A preferred embodiment of the present invention provides a trim sensor system for a marine vessel comprising a stationary housing member, or gimbal housing, which is attached to a transom of the marine vessel. It also comprises a pivotable member, or gimbal ring, which is rotatably attached to the first housing member for rotation about a first axis which, in a preferred embodiment, is a generally vertical steering axis. The invention also comprises a drive structure, or outboard drive, which is rotatably attached to the pivotable member for rotation relative to the pivotable member about a second axis, which is a generally horizontal trim and tilt axis in a preferred embodiment of the present invention. The present invention further comprises a Hall effect rotational position sensor attached to both the pivotable member and the drive structure in order to provide a signal which is representative of the relative position of the drive structure relative to the pivotable member.

In a particularly preferred embodiment of the present invention, the first axis is generally vertical and is the steering axis of the marine propulsion system while the second axis is a generally horizontal axis that is generally stationary relative to the pivotable member. The Hall effect rotational position sensor can comprise a stationary portion attached to the pivotable member and a rotatable portion disposed within the stationary portion and attached to the drive structure. The rotatable portion of the Hall effect rotational position sensor is rotatable about a third axis which can be coincident with the horizontal trim and tilt axis of the system. In a particularly preferred application of the present invention, the drive structure is a sterndrive marine propulsion device.

BRIEF DESCRIPTION OF THE DRAWINGS

The present invention will be more fully and clearly understood from a reading of the description of the preferred embodiment in conjunction with the drawings, in which.

DESCRIPTION OF THE PREFERRED EMBODIMENT

Figure 1:
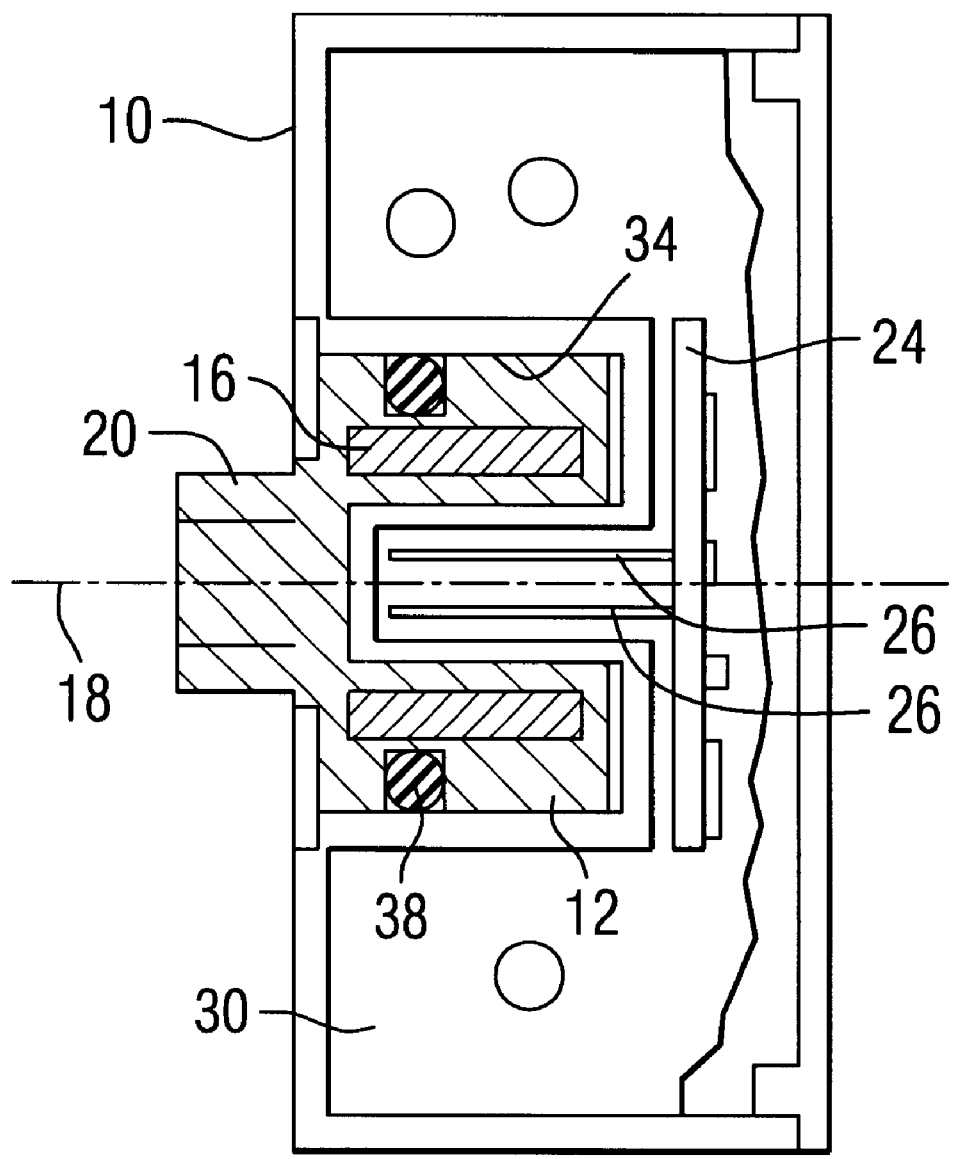
FIG. 1 is a sectional view of a Hall effect rotational position sensor.

Like components will be identified by like reference numerals throughout the description of the preferred embodiment of the present invention.

FIG. 1 is a simplified schematic representation of a known type of Hall effect sensor. Within a housing 10, a rotatable member 12 is provided with one or more magnets 16. The rotatable member 12 is rotatable about an axis 18 and has an extension 20 extending outward from the housing structure 10. A circuit board 24 is provided with one or more Hall-effect components disposed thereon. One or more pole pieces, 26, are attached in magnetic flux communication with the Hall-effect components. The circuit board 24 and its components are enclosed within a potting material 30 to protect the components from the environment. A portion 34 of the housing is recessed to provide a cavity in which the rotor 12 is disposed. By rotating the rotor 12 about axis 18, the magnets 16 are moved relative to the pole pieces 26 and that this movement changes the intensity of magnetic flux imposed on the one or more Hall effect elements. The magnets do not contact the pole piece directly. The rotor member 12 can be provided with a circumferential groove in which an O-ring 38 is disposed.

Although FIG. 1 shows one type of Hall effect sensor, it should be understood that many different types of Hall effect sensors are well known to those skilled in the art and available in commercial quantities.

Figure 2:
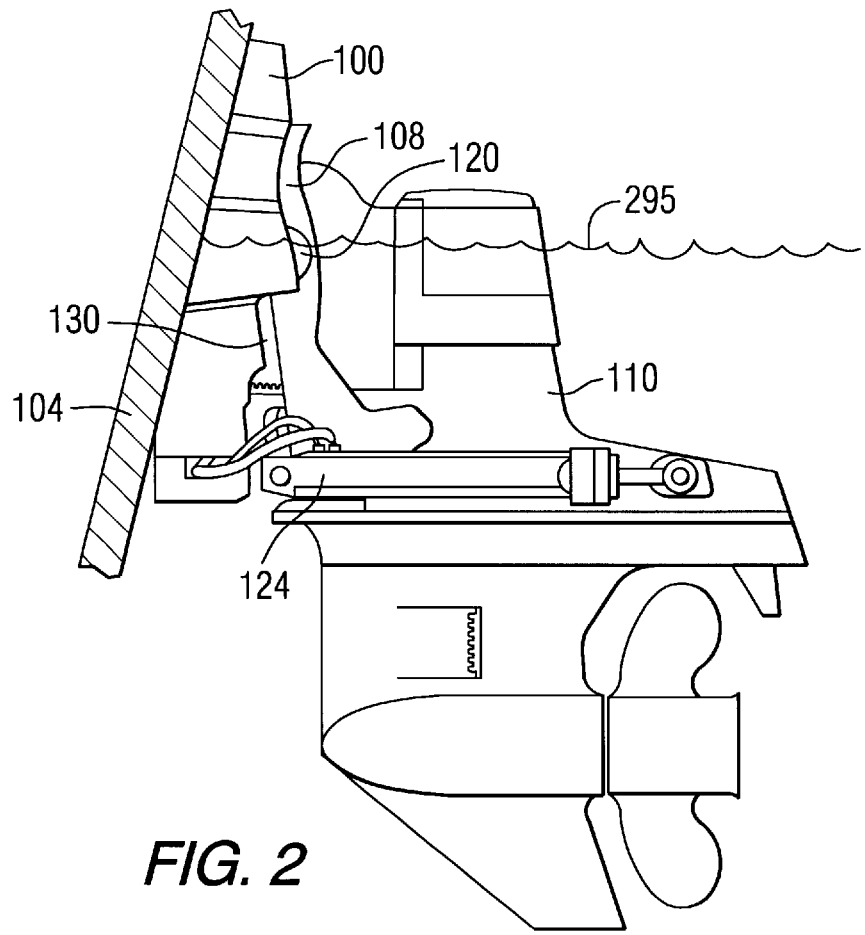
FIG. 2 is a side view of a marine propulsion system showing the location of a rotational position sensor.

FIG. 2 is a side view of a marine propulsion system. A stationary housing member 100, or gimbal housing, is rigidly attached to a transom 104 of a marine vessel. A pivotable member 108, or gimbal ring, is rotatably attached to the stationary housing member 100 for rotation about a first axis. In a preferred embodiment of the present invention, the first axis is a generally vertical steering axis. A drive structure 110 is rotatably attached to the pivotable member 108 for rotation relative to the pivotable member 108 about a second axis, which is generally a horizontal trim and tilt axis. The Hall effect rotational position sensor 120 is attached to both the pivotable member 108 and the outboard drive structure 110 in order to provide a signal which is representative of the relative position of the outboard drive structure 110 relative to the pivotable member 108.

Also shown in FIG. 2 is a trim cylinder 124 which is attached to the drive structure 110 and also attached to the pivotable member 108 to allow the drive structure 110 to be tilted about the horizontal trim and tilt axis.

Figure 3:
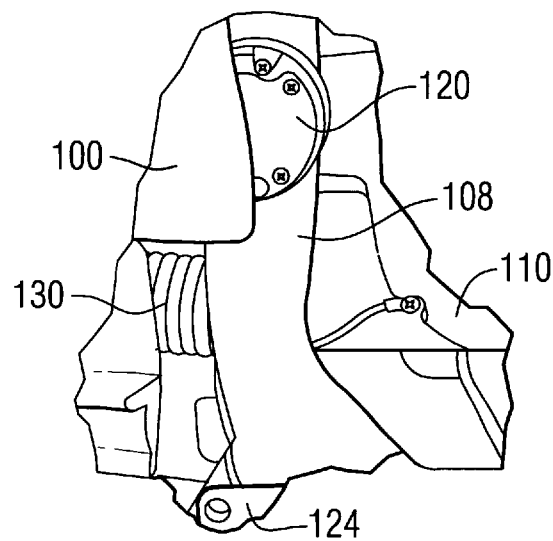
FIG. 3 is an expanded portion of FIG. 2.

FIG. 3 is an enlarged view of a portion of FIG. 2, showing the rotational position sensor 120 attached to the pivotable member 108. Although not specifically shown in FIGS. 2 and 3, it should be understood that the stationary portion of the rotational position sensor 120 is attached to the pivotable member 108 and a rotatable portion of the sensor extends through an opening in the pivotable member 108 to allow the rotatable portion to be attached to the outboard drive structure 110. This relationship will be described below in conjunction with FIG. 4.

In order to facilitate the comparison of FIGS. 2 and 3, a bellows structure 130 is identified in both Figures, along with the rotational position sensor 120, the stationary housing member 100, the pivotable member 108, and the drive structure 110. An end portion of the cylinder 124 is also shown in FIG. 3.

Figure 4:
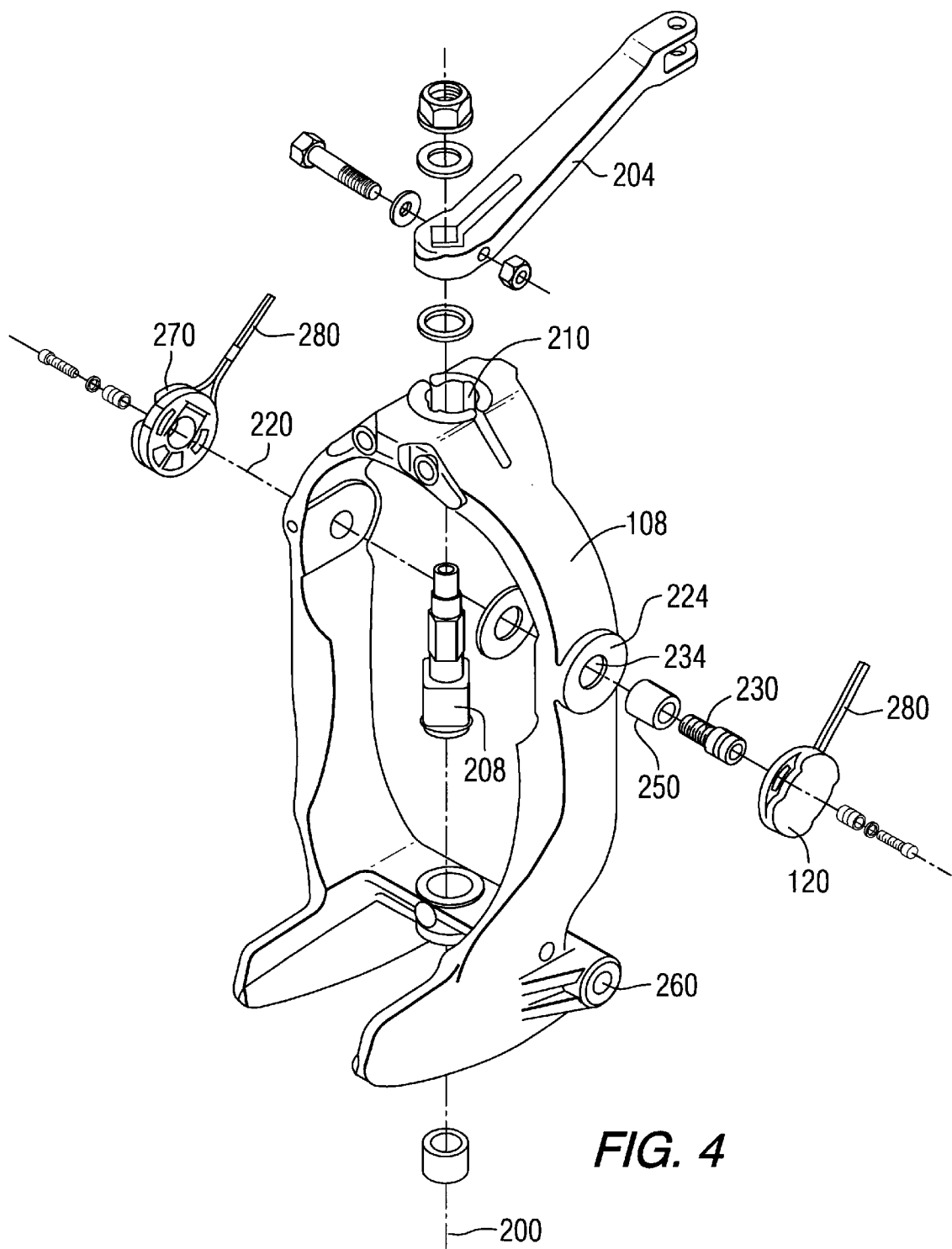
FIG. 4 is an exploded view of a pivotable member, or gimbal ring, of a marine propulsion device with a rotational position sensor.

FIG. 4 is an exploded isometric view of the pivotable member 108, or gimbal ring, along with its associated components. The pivotable member 108, as described above, is associated with the stationary housing member 100 in such a way that the pivotable member 108 is rotatable about the generally vertical steering axis 200. A steering lever 204 is attached to the pivotable member 108 to allow a steering system (not shown) to cause the pivotable member 108 to rotate about the vertical axis 200 for the purpose of steering a marine vessel. The associated bolts, nuts, and washers shown in FIG. 4, proximate the steering lever 204, are used to attach the steering lever to the gimbal ring, or pivotable member 108. A swivel shaft 208 extends upward through opening 210 to facilitate this connection of the steering lever 204 to the pivotable member 108. The bell housing portion of the outboard drive structure 110, shown in FIG. 2, is disposed within the central opening of the pivotable member 108 and rotatably attached to the pivotable member 108 for rotation about axis 220. A stationary portion of the rotational position sensor 120 is attached to the boss 224 of the pivotable member 108 and a rotatable portion 230 of the rotational position sensor extends through opening 234 to allow it to be rigidly attached to the bell housing portion of the drive structure 110. As a result, movement of the outboard drive structure 110 about horizontal axis 220 causes the rotatable portion 230 of the sensor to move relative to the stationary portion of the sensor 120 which is located within the protective housing shown in FIG. 4 and identified by reference numeral 120. A bushing 250 facilitates the rotation of the rotatable portion 230 within opening 234.

With continued reference to FIG. 4, it should be understood that opening 260 is the point at which the hydraulic cylinder 124 is attached to the pivotable member 108, or gimbal ring. In FIG. 4, an alternative sensor location is represented by the component identified by reference numeral 270. The Hall effect rotational position sensor can be attached at either side of the pivotable member 108. Alternatively, redundant Hall effect sensors can be used with one sensor on each side of the pivotable member 108. As a further alternative, one of the rotational position sensors, 120 or 270, can be used to provide a signal that is representative of the relative angular position between the pivotable member 108 and the drive structure 110 while the other sensor, 120 or 270, can be used as a limit sensor which detects the movement of the drive structure 110 beyond preselected maximum threshold of travel. In both cases, signals are provided on wires 280 from the respective sensors, 120 and 270.

By providing a Hall effect sensor 120 as the rotational position sensor for the marine propulsion system, several severe problems can be avoided. As shown in FIG. 2, the sensor 120 is typically located below the water level 295. Therefore, any leak in the protective housing of the rotational position sensor 120 will allow water to seep into the mechanism of the sensor. As a result, any sensor that is dependent on the controlled flow of electricity or electrical signals between uninsulated components within the sensor can be adversely affected. In addition, the Hall effect rotational position sensor avoids other types of damage that can be caused by the shock loads typically experienced by a marine propulsion system. Potentiometers, which rely on the rubbing of one element in direct contact against another element, can be adversely affected by these shock loads. This can result in serious wear and other types of damage and degradation.

Although described in particular detail and illustrated to show one embodiment of the present invention, it should be understood that alternative embodiments are also within its scope.

What is claimed is:

1. A trim sensor system for a marine vessel, comprising:
   a stationary housing member attached to a transom of said marine vessel;
   a pivotable member rotatably attached to said first housing member for rotation about a first axis;
   a drive structure rotatably attached to said pivotable member for rotation relative to said pivotable member about a second axis; and
   a Hall effect rotational position sensor attached to both said pivotable member and said drive structure to provide a signal which is representative of the relative position of said drive structure relative to said pivotable member, said Hall effect rotational position sensor comprising a stationary portion attached to said pivotable member and a rotatable portion disposed within said stationary portion and attached to said drive structure, said rotatable portion being rotatable about a third axis.

2. The system of claim 1, wherein:
   said first axis is generally vertical.

3. The system of claim 1, wherein:
   said second axis is generally horizontal and generally stationary relative to said pivotable member.

4. The system of claim 1, wherein:
   said third and second axes are concentric with each other.

5. The system of claim 1, wherein: said drive structure is a stern drive marine propulsion device.

6. A trim sensor system for a propulsion device of a marine vessel, comprising:
   a stationary housing member attached to a transom of said marine vessel;
   a pivotable member rotatably attached to said first housing member for rotation about a vertical axis;
   a drive structure rotatably attached to said pivotable member for rotation relative to said pivotable member about a second axis; and
   a Hall effect rotational position sensor attached to both said pivotable member and said drive structure to provide a signal which is representative of the relative position of said drive structure relative to said pivotable member, said Hall effect rotational position sensor comprising a stationary portion attached to said pivotable member and a rotatable portion disposed within said stationary portion and attached to said drive structure, said rotatable portion being rotatable about a third axis.

7. The system of claim 6, wherein:
   said second axis is generally horizontal and generally stationary relative to said pivotable member.

8. The system of claim 6, wherein:
   said third and second axes are concentric with each other.

9. The system of claim 8, wherein:
   said drive structure is a stem drive marine propulsion device.

10. A trim sensor system for a propulsion device of a marine vessel, comprising:
    a stationary housing member attached to a transom of said marine vessel;
    a pivotable member rotatably attached to said first housing member for rotation about a vertical axis;
    a drive structure rotatably attached to said pivotable member for rotation relative to said pivotable member about a horizontal axis; and
    a Hall effect rotational position sensor attached to both said pivotable member and said drive structure to provide a signal which is representative of the relative position of said drive structure relative to said pivotable member, said horizontal axis being generally stationary relative to said pivotable member, said Hall effect rotational position sensor comprising a stationary portion attached to said pivotable member and a rotatable portion disposed within said stationary portion and attached to said drive structure, said rotatable portion is rotatable about a third axis, said third and horizontal axes are concentric with each other.

11. The system of claim 10, wherein:
    said drive structure is a stem drive marine propulsion device.

* * * * *